(12) United States Patent
Rioux et al.

(10) Patent No.: US 11,799,934 B1
(45) Date of Patent: Oct. 24, 2023

(54) METHODS AND SYSTEMS FOR ROUTING MEDIA

(71) Applicant: GENETEC INC., Saint-Laurent (CA)

(72) Inventors: Frédéric Rioux, Montréal (CA); Francis Lachance, Blainville (CA)

(73) Assignee: GENETEC INC., Saint-Laurent (CA)

( * ) Notice: Subject to any disclaimer, the term of this patent is extended or adjusted under 35 U.S.C. 154(b) by 0 days.

(21) Appl. No.: 17/976,131

(22) Filed: Oct. 28, 2022

(51) Int. Cl.
*H04L 65/613* (2022.01)
*H04L 45/42* (2022.01)
*H04L 45/74* (2022.01)

(52) U.S. Cl.
CPC ............ *H04L 65/613* (2022.05); *H04L 45/42* (2013.01); *H04L 45/74* (2013.01)

(58) Field of Classification Search
CPC ........ H04L 65/613; H04L 45/42; H04L 45/74
See application file for complete search history.

(56) References Cited

U.S. PATENT DOCUMENTS

| | | | |
|---|---|---|---|
| 10,178,593 B2 | 1/2019 | Talbert et al. | |
| 11,088,862 B2 | 8/2021 | Nadathur et al. | |
| 11,206,412 B2 | 12/2021 | Amini et al. | |
| 11,663,892 B2 * | 5/2023 | Obukhov | G08B 13/19656 386/226 |
| 2011/0242317 A1 * | 10/2011 | Wengrovitz | H04N 7/181 348/E7.091 |
| 2012/0011590 A1 * | 1/2012 | Donovan | H04L 63/1408 726/25 |

FOREIGN PATENT DOCUMENTS

| | | | |
|---|---|---|---|
| CA | 112311644 | 4/2022 | |
| CN | 112449252 | 3/2021 | |
| CN | 110913172 | 7/2021 | |
| CN | 114257282 | 3/2022 | |
| WO | WO-2010040307 A1 * | 4/2010 | ............ H04L 45/00 |

* cited by examiner

*Primary Examiner* — Oanh Duong
(74) *Attorney, Agent, or Firm* — NORTON ROSE FULBRIGHT CANADA LLP

(57) ABSTRACT

A method for routing media in a surveillance system comprises, at a gateway device placed on a local network deployed at a location being surveilled, the gateway device having network connectivity to a cloud computing device, detecting networked device(s) placed on the local network, the networked device(s) comprising media device(s) each configured to generate media stream data as the location is being surveilled, obtaining, based on the detecting, at least one rule indicative of when the media stream data is to be routed via the gateway device and directly to the cloud computing device for processing, monitoring parameter(s) associated with at least one of the local network and an environment of the location to determine whether the at least one rule is satisfied, and, when the at least one rule is satisfied, instructing the networked device(s) to route the media stream data according to the at least one rule.

35 Claims, 4 Drawing Sheets

METHODS AND SYSTEMS FOR ROUTING MEDIA

FIELD

The improvements generally relate to surveillance systems, and more particularly to routing media stream data in a surveillance system.

BACKGROUND

Surveillance systems are typically composed of a variety of different devices connected by a local network deployed at the site being surveilled. Many surveillance systems include cameras or other devices which capture images or video data used in performing surveillance of the site. Increasingly, modern surveillance systems are beginning to employ cloud-aware or other connected devices which can allocate their workload between local processing, within the connected device, and remote or cloud-based processing, available for instance via a remote or cloud server.

These cloud-aware devices may reside on the same local network as other non-cloud-aware devices, including legacy internet protocol (IP) cameras, local storage devices, and the like. A surveillance system or network which is configured to employ both local (also known as "on-premises") resources and cloud-based resources is known as a hybrid deployment. However, because existing cloud-aware devices are typically programmed to solely communicate with the remote or cloud server, the cloud-aware devices are also typically unaware of the other devices or resources potentially available to them on the local network. Existing cloud-aware devices are also vulnerable to unreliable or faulty internet connectivity disrupting their sole channel of communication to the remote or cloud server.

While existing surveillance systems are suitable for their purposes, there remains room for improvement.

SUMMARY

The following presents a simplified summary of one or more implementations in accordance with aspects of the present disclosure, in order to provide a basic understanding of such implementations, without limiting the embodiments presented within the present disclosure. While existing surveillance systems and networks effecting hybrid deployments are suitable for their purposes, existing cloud-aware devices in such deployments—media devices such as cloud cameras, cloud microphones, etc.—are typically unaware of the other devices present on the local network. As a result, the cloud-aware media devices are not equipped to leverage the resources available to them on the local network. This is particularly salient when it comes to providing alternative routes for media produced by the cloud-aware media devices in the event of loss of connectivity or network unreliability.

To this end, the present disclosure provides methods, systems, and computer-readable media for routing media in a surveillance system, which may be performed by the remote or cloud server, or by any suitable device on the local network, including by any media device on the network (whether cloud-aware or otherwise), by a gateway device on the network, or the like. Network detection is performed to detect the other devices present on the local network, including other media devices, other gateway devices, and the like. Based on what other network devices are detected, one or more rules are obtained which indicate when media stream data, produced by the media devices, are to be routed by the gateway device(s), and when the media stream data is to be routed directly to the cloud server. Parameters relating to the network and the environment of the location being surveilled are monitored to determine whether any of the rules are satisfied, and when they are, the media stream is routed accordingly.

In accordance with one aspect, there is provided a method for routing media in a surveillance system. The method comprises, at a gateway device placed on a local network deployed at a location being surveilled, the gateway device having network connectivity to a cloud computing device, detecting one or more networked devices placed on the local network, the one or more networked devices comprising one or more media devices each configured to generate media stream data as the location is being surveilled, obtaining, based on the detecting, at least one rule indicative of when the media stream data is to be routed via the gateway device and when the media stream data is to be routed directly to the cloud computing device for processing, monitoring one or more parameters associated with at least one of the local network and an environment of the location being surveilled to determine whether the at least one rule is satisfied, and when the at least one rule is satisfied, instructing the one or more networked devices to route the media stream data according to the at least one rule.

In at least one embodiment in accordance with any previous/other embodiment described herein, the gateway device is one of a plurality of gateway devices, and the one or more network devices comprise remaining ones of the plurality of gateway devices having network connectivity to the cloud computing service.

In at least one embodiment in accordance with any previous/other embodiment described herein, detecting the one or more networked devices comprises transmitting at least one broadcast message over the local network, receiving, from the one or more networked devices, at least one response message to the at least one broadcast message, and detecting, based on the at least one response message, a presence of the one or more networked devices on the local network.

In at least one embodiment in accordance with any previous/other embodiment described herein, detecting the one or more networked devices comprises determining at least one of an Internet Protocol (IP) address and a configuration of each of the one or more networked devices.

In at least one embodiment in accordance with any previous/other embodiment described herein, determining the configuration of each networked device comprises determining at least one of a type, a transmission capability, and a reception capability of each networked device.

In at least one embodiment in accordance with any previous/other embodiment described herein, determining the configuration of each networked device comprises determining that the one or more media devices comprise at least one first video camera configured to access the cloud computing device via the gateway device.

In at least one embodiment in accordance with any previous/other embodiment described herein, determining the configuration of each networked device comprises determining that the one or more media devices further comprise at least one second video camera configured to directly access the cloud computing device.

In at least one embodiment in accordance with any previous/other embodiment described herein, obtaining the at least one rule comprises sending a request for the at least one rule to the cloud computing device, and receiving the at least one rule from the cloud computing device in response to the request.

In at least one embodiment in accordance with any previous/other embodiment described herein, obtaining the at least one rule comprises sending a request for the at least one rule to a given one of the one or more networked devices, and receiving the at least one rule from the given one of the one or more networked devices in response to the request.

In at least one embodiment in accordance with any previous/other embodiment described herein, instructing the at least one of the one or more networked devices to route the media stream data according to the at least one rule comprises at least one of instructing the at least one of the one or more networked devices to transmit, via the gateway device, the media stream data to local storage media placed on the local network, instructing the at least one of the one or more networked devices to transmit, via the gateway device, the media stream data to the cloud computing device for storage in cloud-based storage media associated with the cloud computing device, and instructing the at least one of the one or more networked devices to transmit the media stream data directly to the cloud computing device for storage in the cloud-based storage media.

In at least one embodiment in accordance with any previous/other embodiment described herein, the method further comprises pre-processing the media stream data prior to transmitting the media stream data to at least one of the local storage media and the cloud-based storage media.

In at least one embodiment in accordance with any previous/other embodiment described herein, pre-processing the media stream data comprises one of modifying a quality of the media stream data, video transcoding the media stream data, decoding the media stream data, re-encoding the media stream data, applying at least one overlay on the media stream data, applying a privacy mask on the media stream data, digitally signing the media stream data, encrypting the media stream data, performing color correction on the media stream data, adding metadata to the media stream data, and identifying, based on the media stream data, one or more objects present in a field of view of the one or more media devices.

In at least one embodiment in accordance with any previous/other embodiment described herein, instructing the at least one of the one or more networked devices to route the media stream data according to the at least one rule comprises instructing the at least one of the one or more networked devices to continuously transmit the media stream data to at least one of the local storage media and the cloud-based storage media for storage over a predetermined time period.

In at least one embodiment in accordance with any previous/other embodiment described herein, detecting the one or more networked devices placed on the local network comprises detecting at least one display device connected to the one or more media devices, the at least one display device configured to render the media stream data thereon.

In at least one embodiment in accordance with any previous/other embodiment described herein, the detecting the one or more networked devices placed on the local network is performed one of periodically, in response to a user-initiated command, in response to a system-initiated command, and in response to the one or more media devices connecting to the local network.

In at least one embodiment in accordance with any previous/other embodiment described herein, monitoring one or more parameters associated with at least one of the local network and an environment of the location being surveilled comprises monitoring at least one of a performance of the local network, a performance of the cloud computing device, a time of day, a current weather at the location, a visibility at the location, a field of view of the one or more media devices, and a positioning of the one or more media devices within the environment.

In accordance with another aspect, there is provided a gateway device for routing media in a surveillance system, the gateway device placed on a local network deployed at a location being surveilled, the gateway device having network connectivity to a cloud computing device and comprising a memory, a processor, and an application stored in the memory and executable by the processor for detecting one or more networked devices placed on the local network, the one or more networked devices comprising one or more media devices each configured to generate media stream data as the location is being surveilled, obtaining, based on the detecting, at least one rule indicative of when the media stream data is to be routed via the gateway device and when the media stream data is to be routed directly to the cloud computing device for processing, monitoring one or more parameters associated with at least one of the local network and an environment of the location being surveilled to determine whether the at least one rule is satisfied, and when the at least one rule is satisfied, instructing the one or more networked devices to route the media stream data according to the at least one rule.

In accordance with another aspect, there is provided a non-transitory computer-readable medium having stored thereon program instructions executable by a processor for, at a gateway device placed on a local network deployed at a location being surveilled, the gateway device having network connectivity to a cloud computing device, detecting one or more networked devices placed on the local network, the one or more networked devices comprising one or more media devices each configured to generate media stream data as the location is being surveilled, obtaining, based on the detecting, at least one rule indicative of when the media stream data is to be routed via the gateway device and when the media stream data is to be routed directly to the cloud computing device for processing, monitoring one or more parameters associated with at least one of the local network and an environment of the location being surveilled to determine whether the at least one rule is satisfied, and when the at least one rule is satisfied, instructing the one or more networked devices to route the media stream data according to the at least one rule.

In accordance with another aspect, there is provided a method for routing media in a surveillance system. The method comprises, at a cloud computing server, determining that one or more networked devices are placed on a local network deployed at a location being surveilled, the one or more networked devices comprising one or more media devices and one or more gateway devices, each media device configured to generate media stream data as the location is being surveilled, and each gateway device having network connectivity to the cloud computing server, obtaining, based on the detecting, at least one rule indicative of when the media stream data is to be routed via the one or more gateway devices and when the media stream data is to be routed directly to the cloud computing server for processing, monitoring one or more parameters associated with at least one of the local network and an environment of the location being surveilled to determine whether the at least one rule is satisfied, and when the at least one rule is satisfied, instructing at least one of the one or more networked devices to route the media stream data according to the at least one rule.

In at least one embodiment in accordance with any previous/other embodiment described herein, determining that the one or more networked devices are placed on the local network comprises receiving, from a given one of the one or more media devices and the one or more gateway devices, at least one signal indicative of a presence of the one or more networked devices on the local network.

In at least one embodiment in accordance with any previous/other embodiment described herein, detecting the one or more networked devices comprises receiving, from at least one of the one or more gateway devices, at least one signal indicative of a presence of the one or more networked devices on the local network.

In at least one embodiment in accordance with any previous/other embodiment described herein, detecting the one or more networked devices comprises receiving, from at least one of the one or more media devices, at least one signal indicative of a presence of the one or more networked devices on the local network.

In at least one embodiment in accordance with any previous/other embodiment described herein, instructing at least one of the one or more networked devices to route the media stream data according to the at least one rule comprises at least one of instructing the at least one of the one or more networked devices to transmit, via the one or more gateway devices, the media stream data to local storage media placed on the local network, instructing the at least one of the one or more networked devices to transmit, via the one or more gateway devices, the media stream data to the cloud computing server for storage in cloud-based storage media provided by the cloud computing server, and instructing the at least one of the one or more networked devices to transmit the media stream data directly to the cloud computing server for storage in the cloud-based storage media.

In at least one embodiment in accordance with any previous/other embodiment described herein, instructing the at least one of the one or more networked devices to route the media stream data according to the at least one rule comprises instructing the at least one of the one or more networked devices to continuously transmit the media stream data to at least one of the local storage media and the cloud-based storage media for storage over a predetermined time period.

In at least one embodiment in accordance with any previous/other embodiment described herein, the detecting the one or more networked devices placed on the local network is performed one of periodically, in response to a user-initiated command, in response to a system-initiated command, and in response to the one or more media devices connecting to the local network.

In at least one embodiment in accordance with any previous/other embodiment described herein, monitoring one or more parameters associated with at least one of the local network and an environment of the location being surveilled comprises monitoring at least one of a performance of the local network, a performance of the cloud computing server, a time of day, a current weather at the location, a visibility at the location, a field of view of the one or more media devices, and a positioning of the one or more media devices within the environment.

In accordance with another aspect, there is provided a cloud computing server comprising a memory, a processor, and an application stored in the memory and executable by the processor for determining that one or more networked devices are placed on a local network deployed at a location being surveilled, the one or more networked devices comprising one or more media devices and one or more gateway devices, each media device configured to generate media stream data as the location is being surveilled, and each gateway device having network connectivity to the cloud computing server, obtaining, based on the detecting, at least one rule indicative of when the media stream data is to be routed via the one or more gateway devices and when the media stream data is to be routed directly to the cloud computing server for processing, monitoring one or more parameters associated with at least one of the local network and an environment of the location being surveilled to determine whether the at least one rule is satisfied, and when the at least one rule is satisfied, instructing at least one of the one or more networked devices to route the media stream data according to the at least one rule.

In accordance with another aspect, there is provided a non-transitory computer-readable medium having stored thereon program instructions executable by a processor for, at a cloud computing server, determining that one or more networked devices are placed on a local network deployed at a location being surveilled, the one or more networked devices comprising one or more media devices and one or more gateway devices, each media device configured to generate media stream data as the location is being surveilled, and each gateway device having network connectivity to the cloud computing server, obtaining, based on the detecting, at least one rule indicative of when the media stream data is to be routed via the one or more gateway devices and when the media stream data is to be routed directly to the cloud computing server for processing, monitoring one or more parameters associated with at least one of the local network and an environment of the location being surveilled to determine whether the at least one rule is satisfied, and when the at least one rule is satisfied, instructing at least one of the one or more networked devices to route the media stream data according to the at least one rule.

In accordance with another aspect, there is provided a method for routing media in a surveillance system. The method comprises, at one of a plurality of media devices placed on a local network deployed at a location being surveilled, detecting one or more networked devices placed on the local network, the one or more networked devices comprising remaining ones of the plurality of media devices and one or more gateway devices, each media device from the plurality of media devices configured to generate media stream data as the location is being surveilled, and each gateway device having network connectivity to a cloud computing device, obtaining, based on the detecting, at least one rule from at least one of the cloud computing device and the one or more gateway devices, the at least one rule indicative of when the media stream data is to be routed via the one or more gateway devices and when the media stream data is to be routed directly to the cloud computing device for processing, monitoring one or more parameters associated with at least one of the local network and an environment of the location being surveilled to determine whether the at least one rule is satisfied, and when the at least one rule is satisfied, routing the media stream data according to the at least one rule.

In at least one embodiment in accordance with any previous/other embodiment described herein, detecting the one or more networked devices comprises transmitting at least one broadcast message over the local network, receiving, from the one or more networked devices, at least one response message to the at least one broadcast message, and detecting, based on the at least one response message, a presence of the one or more networked devices on the local network.

In at least one embodiment in accordance with any previous/other embodiment described herein, obtaining the at least one rule comprises sending a request for the at least one rule to the cloud computing device, and receiving the at least one rule from the cloud computing device in response to the request.

In at least one embodiment in accordance with any previous/other embodiment described herein, obtaining the at least one rule comprises sending a request for the at least one rule to a given one of the one or more networked devices, and receiving the at least one rule from the given one of the one or more networked devices in response to the request.

In at least one embodiment in accordance with any previous/other embodiment described herein, routing the media stream data according to the at least one rule comprises at least one of transmitting, via the one or more gateway devices, the media stream data to local storage media placed on the local network, transmitting, via the one or more gateway devices, the media stream data to the cloud computing device for storage in cloud-based storage media associated with the cloud computing device, and transmitting the media stream data directly to the cloud computing device for storage in the cloud-based storage media.

In at least one embodiment in accordance with any previous/other embodiment described herein, the method further comprises pre-processing the media stream data prior to transmitting the media stream data to at least one of the local storage media and the cloud-based storage media.

In at least one embodiment in accordance with any previous/other embodiment described herein, pre-processing the media stream data comprises one of modifying a quality of the media stream data, video transcoding the media stream data, decoding the media stream data, re-encoding the media stream data, applying at least one overlay on the media stream data, applying a privacy mask on the media stream data, digitally signing the media stream data, encrypting the media stream data, performing color correction on the media stream data, adding metadata to the media stream data, and identifying, based on the media stream data, one or more objects present in a field of view of the plurality of media devices.

In at least one embodiment in accordance with any previous/other embodiment described herein, routing the media stream data according to the at least one rule comprises continuously transmitting the media stream data to at least one of the local storage media and the cloud-based storage media for storage over a predetermined time period.

In at least one embodiment in accordance with any previous/other embodiment described herein, detecting the one or more networked devices placed on the local network comprises detecting at least one local storage media connected to the one or more gateway devices, the at least one local storage media configured to store the media stream data therein.

In at least one embodiment in accordance with any previous/other embodiment described herein, the detecting the one or more networked devices placed on the local network is performed one of periodically, in response to a user-initiated command, in response to a system-initiated command, and in response to the plurality of media devices connecting to the local network.

In at least one embodiment in accordance with any previous/other embodiment described herein, monitoring one or more parameters associated with at least one of the local network and an environment of the location being surveilled comprises monitoring at least one of a performance of the local network, a performance of the cloud computing device, a time of day, a current weather at the location, a visibility at the location, a field of view of the one or more media devices, and a positioning of the one or more media devices within the environment.

In accordance with another aspect, there is provided a media device of a plurality of media devices placed on a local network deployed at a location being surveilled. The media device comprises a memory, a processor, and an application stored in the memory and executable by the processor for detecting one or more networked devices placed on the local network, the one or more networked devices comprising remaining ones of the plurality of media devices and one or more gateway devices, each media device from the plurality of media devices configured to generate media stream data as the location is being surveilled, and each gateway device having network connectivity to a cloud computing device, obtaining, based on the detecting, at least one rule from at least one of the cloud computing device and the one or more gateway devices, the at least one rule indicative of when the media stream data is to be routed via the one or more gateway devices and when the media stream data is to be routed directly to the cloud computing device for processing, monitoring one or more parameters associated with at least one of the local network and an environment of the location being surveilled to determine whether the at least one rule is satisfied, and when the at least one rule is satisfied, routing the media stream data according to the at least one rule.

In accordance with another aspect, there is provided a non-transitory computer-readable medium having stored thereon program instructions executable by a processor for, at a media device placed on a local network deployed at a location being surveilled, detecting one or more networked devices placed on the local network, the one or more networked devices comprising remaining ones of the plurality of media devices and one or more gateway devices, each media device from the plurality of media devices configured to generate media stream data as the location is being surveilled, and each gateway device having network connectivity to a cloud computing device, obtaining, based on the detecting, at least one rule from at least one of the cloud computing device and the one or more gateway devices, the at least one rule indicative of when the media stream data is to be routed via the one or more gateway devices and when the media stream data is to be routed directly to the cloud computing device for processing, monitoring one or more parameters associated with at least one of the local network and an environment of the location being surveilled to determine whether the at least one rule is satisfied, and when the at least one rule is satisfied, routing the media stream data according to the at least one rule.

Many further features and combinations thereof concerning embodiments described herein will appear to those skilled in the art following a reading of the instant disclosure.

DESCRIPTION OF THE FIGURES

In the figures.

It will be noticed that throughout the appended drawings, like features are identified by like reference numerals.

DETAILED DESCRIPTION

Described herein are methods and systems for routing media. In one embodiment, the systems and methods described herein may be used for monitoring and surveillance, and more specifically for routing media stream data generated within an area monitoring system (also referred to herein as a "surveillance system"). It should however be understood that the methods and systems described herein may be used for a variety of applications and other embodiments may therefore apply.

Figure 1:
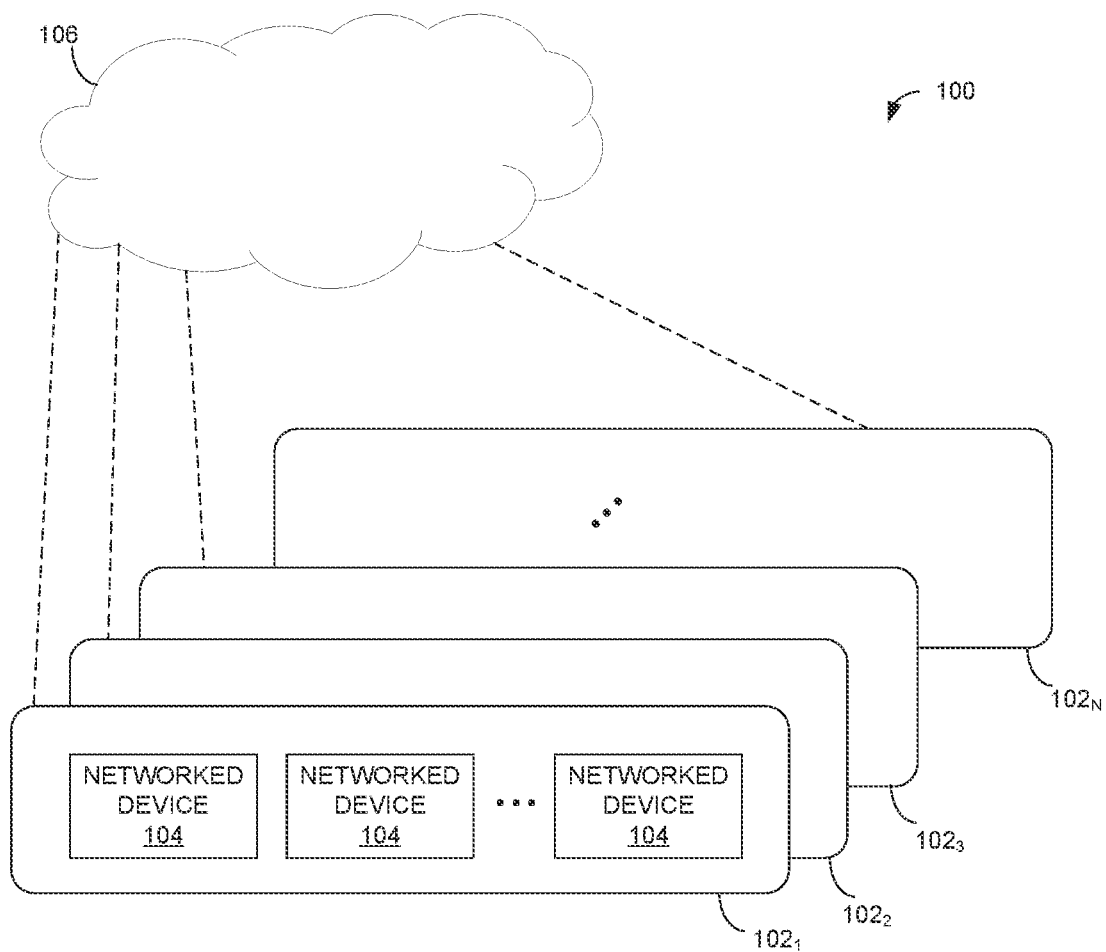
FIG. 1 is a schematic diagram illustrating a system for routing media, in accordance with an illustrative embodiment.

FIG. 1 illustrates an example system 100 for routing media. The system 100 may be a surveillance system. It should however be understood that, while reference is made herein to a system 100 used for security purposes, the system 100 may be used for any other suitable purpose, such as for monitoring public transport or traffic, etc. The system 100 may also be implemented in any suitable environment, such as, but not limited to, a home, a business, or the like.

The system 100 comprises a number (N) of local networks $102_1, 102_2, \ldots,$ and $102_N$ each deployed at a location (or site) being surveilled. For instance, a first network $102_1$ may be deployed at a first geographical location and a second network $102_2$ may be deployed at a second geographical location different from the first geographical location. Any suitable number of networks $102_1, 102_2, \ldots, 102_N$ may apply. In some embodiments, only one network as in $102_1$ is provided. In other embodiments, the system 100 is a distributed system comprising more than one network $102_1, 102_2, \ldots, 102_N$. Each network $102_1, 102_2, \ldots, 102_N$ may comprise any suitable network including, but not limited to, a Personal Area Network (PAN), Local Area Network (LAN), Wireless Local Area Network (WLAN), Metropolitan Area Network (MAN), or Wide Area Network (WAN), or combinations thereof. In one embodiment, each network $102_1, 102_2, \ldots, 102_N$ is a LAN having a plurality of networked devices 104 placed thereon. In addition, each network $102_1, 102_2, \ldots, 102_N$ is communicatively coupled to a cloud-based computing infrastructure 106 which is configured to provide one or more cloud computing services to one or more components of the system 100, as will be described further below.

It should be understood that the system 100 may comprise a wide variety of different network technologies and protocols. Communication between the networked devices 104 may occur across wired, wireless, or a combination of wired and wireless networks. In addition to the networked devices 104 described below with reference to FIG. 2, the system 100 may include any number of devices such as routers, modems, bridges, hubs, switches, and/or repeaters, among other possibilities.

Figure 2:
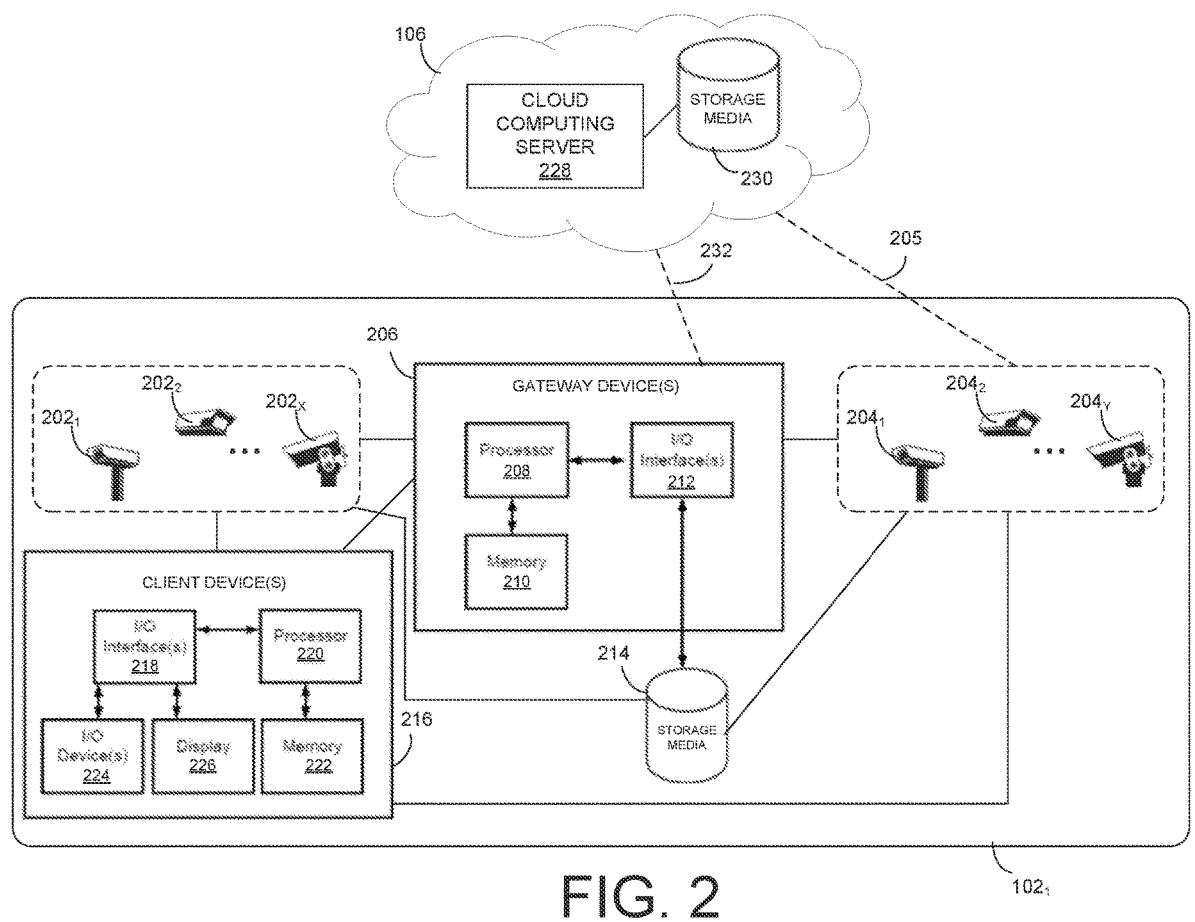
FIG. 2 is a schematic diagram detailing a network and the cloud-based computing infrastructure of the system of FIG. 1, in accordance with an illustrative embodiment.

Referring now to FIG. 2 in addition to FIG. 1, in one embodiment, the plurality of networked devices 104 comprises a first plurality (X) of media devices $202_1, 202_2, \ldots,$ and $202_X$, and a second plurality of media devices (Y) $204_1, 204_2, \ldots,$ and $204_Y$. It should be understood that any suitable number of media devices may apply and that the number of first media devices $202_1, 202_2, \ldots,$ and $202_X$ may be the same as, or different from, the number of second media devices $202_1, 202_2, \ldots,$ and $202_X$. It should however be understood that, in some embodiments, the system 100 may only comprise second media devices $202_1, 202_2, \ldots,$ and $202_X$ and no first media devices $202_1, 202_2, \ldots,$ and $202_X$ may be provided. The opposite may also apply.

As will be described further below, the second plurality of media devices $204_1, 204_2, \ldots, 204_Y$ have direct network connectivity (i.e., are configured to directly connect, through the communication link 205) to the cloud-based computing infrastructure 106 while the first plurality of media devices $202_1, 202_2, \ldots,$ and $202_X$ are not configured to have such direct network connectivity and may only access the cloud-based computing infrastructure 106 via one or more other networked devices 104, namely via one or more gateway devices 206 to which they are connected. The first plurality of media devices $202_1, 202_2, \ldots, 202_X$ may therefore be referred to as "traditional" cameras and the second plurality of media devices $204_1, 204_2, \ldots, 204_Y$ may be referred to as "cloud cameras".

The media devices $202_1, 202_2, \ldots, 202_X$ and $204_1, 204_2, \ldots, 204_Y$ may be used to monitor objects, events, places, and/or people of interest within the location under surveillance. As a result of such monitoring, the media devices $202_1, 202_2, \ldots, 202_X$ and $204_1, 204_2, \ldots, 204_Y$ generate media streams, which may include image and/or video data (e.g., meta-data, compressed video data, and/or uncompressed video data) and/or audio data, all referred to herein as "media stream data". In one embodiment, the media devices $202_1, 202_2, \ldots, 202_X$ and $204_1, 204_2, \ldots, 204_Y$ comprise digital video cameras (e.g., fixed cameras, dome cameras, pan, tilt, and zoom—or PTZ—cameras, panoramic and multi-sensor cameras, and the like) disposed within the location under surveillance. Such video cameras may comprise Internet Protocol (IP) cameras configured to send the media stream data via the network $102_1, 102_2, \ldots, 102_N$ they are placed in, which may, in this case, comprise an IP network. The media devices $202_1, 202_2, \ldots, 202_X$ and $204_1, 204_2, \ldots, 204_Y$ may also (or alternatively) comprise any suitable surveillance device including, but not limited to, radars, audio microphones, video and/or audio encoders connected to analog device(s) or appliance(s), sensors, door stations, intercoms, and the like.

Furthermore, the media devices $202_1, 202_2, \ldots, 202_X$ and $204_1, 204_2, \ldots, 204_Y$ may provide the media stream data in real-time or non-real time. The media devices $202_1, 202_2, \ldots, 202_X$ and $204_1, 204_2, \ldots, 204_Y$ may comprise local storage. In embodiments in which the media stream data is provided in non-real time, the media devices $202_1, 202_2, \ldots, 202_X$ and $204_1, 204_2, \ldots, 204_Y$ may comprise devices, such as network-attached storage media having media stream data recorded therein. It should therefore be understood that while reference is made herein to the media devices $202_1, 202_2, \ldots, 202_X$ and $204_1, 204_2, \ldots, 204_Y$ being video cameras, this is for illustrative purposes only and any other suitable media device may apply. It should also be understood that each group of media devices (i.e. the first media devices $202_1, 202_2, \ldots, 202_X$ and the second media devices $204_1, 204_2, \ldots, 204_Y$) may comprise devices of different types. In addition, the first media devices $202_1, 202_2, \ldots, 202_X$ may be of a different type than the second media devices $204_1, 204_2, \ldots, 204_Y$. For example, the first media devices $202_1, 202_2, \ldots, 202_X$ may comprise video cameras and the second media devices $204_1, 204_2, \ldots, 204_Y$ may comprise microphones. Other embodiments may apply.

When the system 100 comprises several media devices $202_1, 202_2, \ldots, 202_X$ and $204_1, 204_2, \ldots, 204_Y$, these may be located in close proximity to one another, for instance in the same building or on the same city block, or they may be remote from one another, for instance, located in different parts of the same city or in different cities altogether. Embodiments involving clusters of media devices $202_1, 202_2, \ldots, 202_X$ and $204_1, 204_2, \ldots, 204_Y$ may also be considered, where media devices $202_1, 202_2, \ldots, 202_X$, and $204_1, 204_2, \ldots, 204_Y$ belonging to one of a number of clusters may be geographically proximate to one another while the clusters themselves may be remote from one another.

Still referring to FIG. 2 in addition to FIG. 1, in one embodiment, the plurality of networked devices 104 further comprises one or more gateway devices 206 communicatively coupled to the media devices $202_1, 202_2, \ldots, 202_X$ and/or $204_1, 204_2, \ldots, 204_Y$. Although the gateway device(s) 206 are illustrated as being connected to the media devices $204_1, 204_2, \ldots, 204_Y$ (which have direct network connectivity to the cloud-based computing infrastructure 106), it should be understood that this is for illustrative purposes only and, in some embodiments, there may be no direct connection between the gateway device(s) 206 and the media devices $204_1, 204_2, \ldots, 204_Y$. In addition, although the media devices $202_1, 202_2, \ldots, 202_X$, the media devices $204_1, 204_2, \ldots, 204_Y$, and the gateway device(s) 206 are illustrated as being provided on the same (i.e. common) local network $102_1$, it may, in some embodiments, be suitable for only the media devices $204_1, 204_2, \ldots, 204_Y$ and the gateway device(s) 206 to be on the same local network as in $102_1$. Therefore, in some embodiments, the media devices $202_1, 202_2, \ldots, 202_X$, may be provided on a local network different from the local network $102_1$ on which the media devices $204_1, 204_2, \ldots, 204_Y$, and the gateway device(s) 206 are provided. Each gateway device 206 is configured to provide a connection (and allows communication and data flow) between the networks $102_1, 102_2, \ldots, 102_N$ and the cloud-based computing infrastructure 106, which have different network protocol technologies.

In one embodiment, and as will be discussed further below, one or more of the gateway devices 206 are configured to instruct at least one of the media devices $202_1, 202_2, \ldots, 202_X$ and $204_1, 204_2, \ldots, 204_Y$ on the manner in which the media stream data generated by the media devices $202_1, 202_2, \ldots, 202_X$ and $204_1, 204_2, \ldots, 204_Y$ is to be routed within the system 100 for subsequent data management and processing. The gateway device(s) 206 may be used to provide to the first plurality of media devices $202_1, 202_2, \ldots,$ and $202_X$ connectivity to the cloud-based computing infrastructure 106. The gateway device(s) 206 may further cause the media stream data generated by the media device(s) $202_1, 202_2, \ldots, 202_X, 204_1, 204_2, \ldots,$ and/or $204_Y$ to be stored (i.e. archived) in storage media 214, the memory 210, and/or in the cloud-based computing infrastructure 106 for subsequent use.

Each gateway device 206 comprises at least one processor 208, at least one memory 210, and at least one input/output (I/O) interface 212, the processor 208 being communicatively coupled to the memory 210 and the I/O interface(s) 212. The processor 208, the memory 210 and the I/O interface(s) 212 may be linked via bus connections. The processor 208 may be a general-purpose programmable processor. In the example of FIG. 2, the processor 208 is shown as being unitary, but the processor 208 may also be multicore, or distributed (e.g. a multi-processor).

The memory 210 stores program instructions and data used by the processor 208 to implement the data routing and/or storage functions described further below. The memory 210 may also store locally media stream data, acting as a local database, as well as store information regarding the media device(s) $202_1, 202_2, \ldots, 202_X, 204_1, 204_2, \ldots,$ and/or $204_Y$ that are accessible to the gateway device 206. For example, the memory 210 may store the identity, IP address, and configuration (e.g., type, transmission capability, reception capability, connectivity capabilities to the cloud-based computing infrastructure 106, etc.) of the media device(s) $202_1, 202_2, \ldots, 202_X, 204_1, 204_2, \ldots,$ and/or $204_Y$. The memory 210, though shown as unitary for simplicity in the example of FIG. 2, may comprise multiple memory modules and/or caching. In particular, the memory 210 may comprise several layers of memory such as a hard drive, external drive (e.g. SD card storage) or the like and a faster and smaller Random Access Memory (RAM) module. The RAM module may store data and/or program code currently being, recently being or soon to be processed by the processor 208 as well as cache data and/or program code from a hard drive. A hard drive may store program code and be accessed to retrieve such code for execution by the processor 208 and may be accessed by the processor 208 to store and access data. The memory 210 may have a recycling architecture for storing, for instance, occurrence records, data source and/or database coordinates, where older data files are deleted when the memory 210 is full or near being full, or after the older data files have been stored in memory 210 for a certain time.

The I/O interface(s) 212 may comprise a network interface and may be a wired or wireless interface for establishing a remote connection with, for example, a remote server, an external data source (not shown), the client device 110, etc. For instance, the I/O interface(s) 212 may be an Ethernet port, a WAN port, a TCP port, etc. The I/O interface(s) 212 may be used for communication with the media device(s) $202_1, 202_2, \ldots, 202_X, 204_1, 204_2, \ldots,$ and/or $204_Y$, client device(s) 216, and/or storage media 214 which may be one or more external database(s), one or more external systems, for example, having one or more databases, that are accessible via Application Programming Interface (API) calls, and/or one or more local databases that are part of the gateway device 206.

The storage media 214 may be used to archive (e.g., alternatively or in addition to the memory 210) the media stream data received from the media device(s) $202_1, 202_2, \ldots, 202_X, 204_1, 204_2, \ldots,$ and/or $204_Y$ via the gateway device(s) 206, for subsequent use including, but not limited to, data processing and real-time or delayed access by authorized user(s) of the surveillance system 100). The storage media 214 may be accessible to the gateway device(s) 206, the media device(s) $202_1, 202_2, \ldots, 202_X$, and the media device(s) $204_1, 204_2, \ldots, 204_Y$. The storage media 214 may comprise a medium (i.e. a computer-readable medium) configured to storing data in a format readable by a processor or other computing device. The storage media 214 may, in some embodiments, be one or more servers comprising one or more databases. In such embodiments, the one or more servers may have processing and/or analytics capabilities and may have their own connection to the cloud-based computing infrastructure 106, thus also serving as gateway device(s).

Still referring to FIG. 2 in addition to FIG. 1, in one embodiment, the plurality of networked devices 104 further comprises client device(s) 216 in communication with the one or more media device(s) $202_1, 202_2, \ldots, 202_X, 204_1, 204_2, \ldots,$ and/or $204_Y$, as well as with the gateway device(s) 206. One or more client devices 216 may be provided, in close proximity to one another, for instance located in the same office or data center, or remote from one another, for instance located in different offices and data centers dispersed across the same city or in different cities altogether. Each client device 216 may be a remote computing device (i.e. functioning as a client) that comprises a plurality of components interconnected via bus connections and the like. In the illustrated example, each client device 216 comprises I/O interface(s) 218, at least one processor 220, at least one memory 222, I/O device(s) 224 (e.g., a keyboard, a mouse, a touchscreen, etc.), and at least one display device 226 (e.g. a screen, a tactile display, etc.). The client device 216 may be a desktop computer, a laptop, a smartphone, a tablet, etc. The processor 220, the memory 222 and the I/O interface(s) 218 may be similar to the processor 208, the memory 210 and the I/O interface(s) 212, respectively.

A client application program may be stored in the memory 222 of each client device 216, the client application program providing the user with an interface to interact with a gateway device 206. In some embodiments, the gateway device 206 may be connected to at least one client device 216, where, for instance, the connection between the gateway device and the client device 216 may be a wired connection. In some embodiments, the functionality of the gateway device 206 and the client device 216 may be implemented on a single computing device.

The client device 216 may be operated by authorized user(s) to access, view, process, edit and/or analyze information associated with the media stream data generated by the media device(s) $202_1, 202_2, \ldots, 202_X, 204_1, 204_2, \ldots,$ and/or $204_Y$. The information may comprise video information, such as a video feed, as well as any other relevant information obtained from the gateway device(s) 206. The client device 216 may be configured to launch a video playback application, a web browser, or a web application (not shown) that renders a graphical user interface (GUI) on the display device 226. The GUI may be used to display outputs and accept inputs and/or commands from user(s) of the client device 216. The GUI may further provide user(s) with the ability to view and/or edit video feeds, as well as be presented information of interest related to the video feeds.

Still referring to FIG. 2 in addition to FIG. 1, in one embodiment, the cloud-based computing infrastructure 106 is configured to run part of the workload of components of the video surveillance system 100 in the cloud. In particular, the cloud-based computing infrastructure 106 may provide any suitable cloud computing service(s) related to management of the video surveillance system 100 including, but not limited to, processing of media stream data, cloud archiving or storage of media stream data, storage of video indexes, off-network live video requests and viewing, video analysis, indexing and persisting metadata for applications such as forensic search, live video camera health monitoring, alert scheduling, bandwidth management, or other form of processing and/or management related to the media stream data. For this purpose, in one embodiment, the cloud-based computing infrastructure 106 comprises a cloud computing device (referred to herein as a cloud computing server) 228 communicatively coupled to cloud-based storage media 230. The cloud computing server 228 may comprise one or more virtual processors configured to process the media stream data upon receipt thereof and cause the cloud computing service(s) to be provided.

As previously noted and as can be seen in FIG. 2, the gateway device(s) 206 and the second plurality of media devices $204_1, 204_2, \ldots, 204_Y$ have connectivity to the cloud-based computing infrastructure 106. Each gateway device 206 may have direct connectivity to the cloud-based computing infrastructure 106 (e.g., via communication link 232) or indirect connectivity thereto (e.g., via one or more other gateway devices 206). In other words, the gateway device(s) 206 and the second plurality of media devices $204_1, 204_2, \ldots, 204_Y$ are configured to directly communicate with the cloud computing server 228 and/or the cloud-based storage media 230 via communication links 232 and 205, respectively. In contrast, the first plurality of media devices $202_1, 202_2, \ldots, 202_X$ do not have direct network connectivity to the cloud-based computing infrastructure 106 and may only communicate with (e.g., transmit media stream data to) the cloud computing server 228 and/or the cloud-based storage media 230 via the gateway device(s) 206, as will be described further below.

It is proposed herein to route the media stream data generated by the media devices $202_1, 202_2, \ldots, 202_X$ and/or $204_1, 204_2, \ldots, 204_Y$ within the system 100 dynamically, based on one or more rules (also referred to as "policies"). The rules ensure that the routing is performed correctly and the rules may vary depending on the configuration of the system 100 and on the type of networked devices 104 present on the networks $102_1, 102_2, \ldots, 102_N$. As such, in one embodiment, routing of the media stream data within the system 100 is performed subsequent to detecting the networked devices 104 placed on the network (e.g., the LAN) as in $102_1$ deployed at the location being surveilled. The networked devices 104 as detected may comprise one or more of the media devices $202_1, 202_2, \ldots, 202_X, 204_1, 204_2, \ldots, 204_Y$, the gateway device(s) 206, the storage media 214, and/or the client device(s) 216.

The detection of the networked devices 104 may be performed by any suitable computing device (also referred to herein as a "detection device") provided as part of the system 100 and configured to perform the detection. In some embodiments, the detection device is a given gateway device 206. In other embodiments, the detection device is a given media device $202_1, 202_2, \ldots, 202_X, 204_1, 204_2, \ldots, 204_Y$, and more particularly a given second media device $204_1, 204_2, \ldots,$ or $204_Y$. In yet other embodiments, the detection device is a given first media device $202_1, 202_2, \ldots,$ or $202_X$.

The detection may be performed at the detection device actively, i.e. by the detection device itself. In one embodiment, active detection may be performed by a detection device (e.g., the given gateway device 206 or the given second media device $204_1, 204_2, \ldots,$ or $204_Y$) already placed on the network as in $102_1$. In particular, a device located on the network $102_1$, such as one or more of the gateway device(s) 206 or one or more of the media devices $202_1, 202_2, \ldots, 202_X, 204_1, 204_2, \ldots, 204_Y$, may discover other networked devices 104 belonging to the same network $102_1$. For example, the gateway device(s) 206 may detect one another. A second media device $204_1, 204_2, \ldots,$ or $204_Y$ may also be configured to detect the first media devices $202_1, 202_2, \ldots, 202_X$ placed on the network $102_1$ (and vice versa). A second media device $204_1, 204_2, \ldots,$ or $204_Y$ may also be configured to detect the gateway device(s) 206 placed on the network $102_1$ (e.g., the gateway device 206 positioned at a shortest distance to the media device's location), and the gateway device(s) 206 may in turn detect the second media device $204_1$, $204_2$, . . . , or $204_Y$. The gateway device(s) 206 may also detect the storage media 214 and/or detect the client device(s) 216 placed on the network $102_1$. It should be understood that the detection may be performed by any other suitable networked device 104 placed on the network $102_1$.

The detection may alternatively be performed passively. In this case, the detection device may receive information indicative of the presence of the networked devices 104 on the network as in $102_1$. The information may be received from a device already placed on the network as in $102_1$ and communicatively coupled to the other networked devices 104, from the given gateway device 206 or from the given second media device $204_1$, $204_2$, . . . , or $204_Y$, or the like) having performed the active detection. In one embodiment, passive detection may be performed by a detection device (e.g., the cloud computing server 228) that is not already placed on the network as in $102_1$. For example, the cloud computing server 228 may be configured to instruct the gateway device 206 (or any other device placed on the local network $102_1$) to monitor the network $102_1$. The gateway device 206 may in turn generate at least one detection signal indicative of the presence of the other networked devices 104 placed on the network $102_1$, and communicate the at least one detection signal to the detection device (e.g., to the cloud computing server 228) via any suitable means. It should however be understood that a device placed on the network as in $102_1$ may also be configured to perform passive detection.

The detection of the networked devices 104 present on the network $102_1$ may be performed by the detection device periodically, i.e. at predetermined time intervals. Alternatively, the detection may be performed in response to the detection device receiving a user-initiated command, upon a user providing (e.g., via the I/O device(s) 224 of their client device 216) instructions to detect the presence of the networked devices 104. In other embodiments, the detection may be performed in response to the detection device receiving a system-initiated command, which may automatically generated once one or more of the media devices $202_1$, $202_2$, . . . , $202_X$, $204_1$, $204_2$, . . . , $204_Y$ are placed on the network $102_1$. For example, the detection may be configured to be part of an initialization process when a media device $202_1$, $202_2$, . . . , $202_X$, $204_1$, $204_2$, . . . , or $204_Y$ is added to the network $102_1$. The detection may also be performed programmatically or via a system policy.

In one embodiment, active detection involves performing, at the detection device, a network discovery routine to locate the devices 104 present on the network $102_1$. In some embodiments, the outcome of the network discovery routine is sent (e.g., by any device present on the local network $102_1$) to the cloud computing server 228. Any suitable network discovery routine may be performed. In one embodiment, the detection device may send, using any suitable communication means, at least one broadcast message over the network $102_1$. Upon receipt of a broadcast message, each networked devices 104 placed on the network $102_1$ may generate a response message indicative of the presence of the networked device 104 placed on the network $102_1$. Each response message may contain information (e.g., IP address, configuration, etc.) uniquely identifying the networked device 104. In addition to indicating the presence of networked devices 104 on the network $102_1$, the detection process may therefore allow to determine the IP address and configuration of the detected devices 104. As used herein, the term "configuration", when relating to the networked devices 104, refers to one or more parameters indicative of a device's type, transmission capability, and/or reception capability. For example, determining the configuration of the networked devices 104 present on the network $102_1$ comprises determining that the networked devices comprise at least one second media device $204_1$, $204_2$, . . . , or $204_Y$ configured to directly access the cloud-based computing infrastructure 106. Determining the configuration of the networked devices 104 may further (or alternatively) comprise determining that the networked devices 104 comprise at least one first media device $202_1$, $202_2$, . . . , or $202_X$ configured to access the cloud-based computing infrastructure 106 via one or more gateway devices 206. In some embodiments, determining the configuration of the networked devices 104 may also comprise determining that a given device is already enrolled in a given system (e.g., on the local network $102_1$). In this manner, it may be possible to avoid attempting to re-enroll the given device with the given system.

Once the networked devices 104 have been detected, one or more rules (also understood to be "routing rules") based on which routing of the media stream data is to be performed are obtained. Each rule ensures proper routing of media stream data within the system 100, from a source to a destination. The rules may be determined using any suitable means or technique, in order to achieve any desired objective in relation to the system 100. In one embodiment, the rules are set in order to optimize costs, network usage, system reliability, and resiliency to disconnection.

As used herein, the term "reliability", when referring to the system 100, refers to the fact that one can depend (or rely) on the system 100 to operate as expected. For a video-surveillance system, such as the system 100, reliability may encompass several aspects including, but not limited to, ensuring that video is recorded and available at all times or ensuring proper management of the network bandwidth. In the present disclosure, the term "logically continuous", when used in association with a change of destination in the media stream, refers to a media stream where little to no data is lost when the destination of the media stream is changed. However, in some examples, some (but little) data may still be lost due to the transition. As used herein, the term "resiliency to disconnection" refers to the fact that recording gaps in the media stream data are avoided even in the event of disconnection of the media device $202_1$, $202_2$, . . . , $202_X$, $204_1$, $204_2$, . . . , $204_Y$ generating the media stream data. For example, if a media device $202_1$, $202_2$, . . . , $202_X$, $204_1$, $204_2$, . . . , $204_Y$ (e.g., a video camera) continuously streams data to the cloud-based storage media 230 and loses network (e.g., Internet) connectivity, recording gaps in the video archive can be avoided by relying on local storage provided at the local networks $102_1$, $102_2$, . . . , $102_N$. In particular, the local storage (e.g., the storage media 214 or storage within the media devices $202_1$, $202_2$, . . . , $202_X$, $204_1$, $204_2$, . . . , $204_Y$) may act as a buffer that allows for the system 100 to fill any gaps in cloud storage when network connectivity is restored.

A rule may only be applicable under certain circumstances (i.e. when certain condition(s) are met) and may not be applicable under others. When the condition(s) are met, the rule is said to be satisfied and it can be applied (i.e. implemented or followed) to route the media stream data within the system 100. The condition(s) may relate to the networks $102_1$, $102_2$, . . . , $102_N$, an environment of the location under surveillance by the system 100, components of the system 100, or the like. As will be discussed further below, one or more parameters are therefore monitored to assess whether the conditions are met and whether the rule is applicable. In some embodiments, only one rule is satisfied, and therefore applicable, at any given time. In other embodiments, more than one rule may be satisfied, and therefore applicable, at any given time.

In some embodiments, a rule may indicate that the media stream data should remain available at all times or most (e.g., 99%) of the time. In other embodiments, a rule may indicate that the media stream data is to be stored (using the same or different quality) in a redundant manner: locally (e.g., in storage media 214), in the memory 210 of the gateway device 206, and in the cloud-based storage media at all times for subsequent viewing by a client device 216.

As another example, in order to comply with governmental regulations, a rule may indicate that the media stream data (e.g., uninterrupted or continuous video footage) is to be archived for a predetermined time period. This may be the case, for instance, in certain jurisdictions where certain businesses are required to maintain at all times at least a predetermined number of days (e.g., 30, 90, or 180 days) of archived video records for all video cameras on their premises or face potential fines.

As another example, a rule may indicate that a given analysis (e.g., video analysis) is to be performed on the media stream data prior to storage thereof (e.g., in the cloud-based storage media 230). As yet another example, in order to optimize network usage, a rule may indicate that the analysis of the media stream data is to be performed at a given time of day (e.g., in the evenings or during business hours), during off-peak periods (e.g., on the weekends), or the like. As yet another example, a rule may indicate that, in order to minimize costs, local resources (e.g., the processor 208 of the gateway device 206, rather than the cloud computing server 228) are to be used to decode and analyze video streams generated by the media devices $202_1$, $202_2$, ..., $202_X$, $204_1$, $204_2$, ..., $204_Y$. For instance, a rule may indicate that the media stream data is to be sent to the gateway device 206 where processing (e.g., video transcoding, decoding, and/or re-encoding) of the media stream data is to be performed prior to the media stream data being sent to the cloud-based storage media 230.

As another example, a rule may indicate that, in order to minimize computational costs, media stream data having a different (e.g., lower) quality is to be sent to the gateway device where computationally intensive analytics are to be performed. As yet another example, a rule may indicate that the media stream data is to be sent to the gateway device 206 so that the latter can control the bandwidth used between the networks $102_1$, $102_2$, ..., $102_N$ and the cloud-based computing infrastructure 106 and, if needed, degrade the quality of some of the media stream data based on predefined criteria.

It should be understood that the examples of rules provided herein are for the purpose of illustration and that other embodiments may apply, depending on the application.

In one embodiment, the rule(s) are stored in the cloud-based storage media 230. The cloud computing server 228 may therefore access the cloud-based storage media 230 to retrieve the rule(s) and determine the routing to be performed based on evaluation of the rule(s). For example, the cloud computing server 228 may be configured to evaluate rules such as whether a network storage (e.g., storage media 214) is full, whether the connection between the cloud-based computing infrastructure 106 and the second media devices $204_1$, $204_2$, ..., or $204_Y$ is of low quality, and the like. It should however be understood that, in some embodiments, it may be beyond the configuration of the cloud computing server 228 to evaluate rules specific to the local $102_1$ network. For example, the cloud computing server 228 may not evaluate rules related to whether there is congestion on the local network $102_1$. Alternatively, when routing is performed by a networked device 104 placed on the network $102_1$ (e.g. by the gateway device 206 or a second media device $204_1$, $204_2$, ..., or $204_Y$), the networked device 104 may send a request for the rule(s) to the cloud computing server 228. The cloud computing server 228 retrieves the rule(s) from the cloud-based storage media 230 and transmits the retrieved rule(s) to the requesting entity (e.g. the gateway device 206 or second media device $204_1$, $204_2$, ..., $204_Y$) which then applies the rule(s) to determine the routing to be performed.

In another embodiment, the rule(s) are stored in memory or storage placed on the local network $102_1$ and may be obtained (i.e., retrieved) by a networked device 104 placed on the network $102_1$ (e.g. by a given gateway device 206 or a second media device $204_1$, $204_2$, ..., $204_Y$). For instance, the rule(s) may be stored in the memory 210 of a given gateway device 206, in local storage of the media devices $202_1$, $202_2$, ..., $202_X$, $204_1$, $204_2$, ..., $204_Y$, or in the storage media 214 accessible to the given gateway device 206 and to the media devices $202_1$, $202_2$, ..., $202_X$, $204_1$, $204_2$, ..., $204_Y$. The given gateway device 206 may then access the memory 210, the storage media 214, or the memory 222 to obtain (i.e. retrieve) the rule(s). The given gateway device 206 may then evaluate the rule(s) to determine the routing to be performed. In embodiments where an entity other than the given gateway device 206 (e.g., a second media device $204_1$, $204_2$, ..., $204_Y$) is configured to evaluate the rule(s) to determine the routing, the given gateway device 206 may then transmit (using any suitable communication means) the retrieved rule(s) to this entity.

In yet other embodiments, the rule(s) may be stored in storage media (not shown) accessible to a device placed on the local network $102_1$ (e.g., a gateway device 206, or a second media device $204_1$, $204_2$, ..., $204_Y$) and the given local device may access the storage media to retrieve the rule(s), which are in turn transmitted (using any suitable communication means) to the entity (e.g., the cloud computing server 228, a given gateway device 206, or a second media device $204_1$, $204_2$, ..., $204_Y$) configured to evaluate the rule(s) for implementation of the routing. A request for the rule(s) may therefore be sent (e.g. by the cloud computing server 228, the given gateway device 206, or the second media device $204_1$, $204_2$, ..., or $204_Y$) to the given local device and the given local device may in turn transmit the rule(s) in response to the request.

Once the at least one rule has been obtained, the gateway device 206, the media device $202_1$, $202_2$, ..., $202_X$, $204_1$, $204_2$, ..., or $204_Y$, or the cloud-computing server 228 assesses whether the at least one rule is satisfied and applies the at least one rule (when satisfied) for routing the media stream data according to the rule. For any given device of the system 100 (e.g. the cloud computing server 228, the given gateway device 206, or the second media device $204_1$, $204_2$, ..., or $204_Y$), applying a rule may entail actively routing the media stream data from its source to its final destination or sending instructions to another components of the system 100 to cause the media stream data to be routed. For example, the second media device $204_1$, $204_2$, ..., or $204_Y$ may be configured to actively route its media stream data (or that generated by one or more other media devices $202_1$, $202_2$, ..., $202_X$, $204_1$, $204_2$, ..., $204_Y$) to its final destination in order to apply the at least one rule. The cloud computing server 228 and the given gateway device 206 may be configured to instruct a media device $202_1$, $202_2$, ..., $202_X$, $204_1$, $204_2$, ..., $204_Y$ to route its media stream data (or that generated by one or more other media devices $202_1$, $202_2$, ..., $202_X$, $204_1$, $204_2$, ..., $204_Y$) to its final destination in order to apply the at least one rule.

To assess whether the at least one rule is satisfied, the gateway device 206, the media device $202_1$, $202_2$, ..., $202_X$, $204_1$, $204_2$, ..., $204_Y$, or the cloud-computing server 228 periodically monitors one or more parameters associated with the networks $102_1$, $102_2$, ..., and $102_N$, with the cloud-based infrastructure 106, and/or with the environment of the location being surveilled. The parameters associated with the network $102_1$ and the cloud-based infrastructure 106 include, but are not limited to, performance which may encompass bandwidth, latency, error rate, and other measures indicative of network quality and connectivity, as well as cost-consideration parameters and parameters associated with cloud provider agreements, such as a monthly cloud data cap, a current capacity of cloud resources (e.g., evaluated in real-time), cloud-metering parameters, and the like. The parameters associated with the environment include, but are not limited to, a time of day, a current weather at the location, a visibility level at the location, a positioning of the media devices $202_1$, $202_2$, ..., $202_X$, $204_1$, $204_2$, ..., $204_Y$ within the environment, and a field of view of the media devices $202_1$, $202_2$, ..., $202_X$, $204_1$, $204_2$, ..., $204_Y$. For example, a rule indicating that the analysis of the media stream data is to be performed at a given time of day (e.g., in the evenings or during business hours) is only satisfied when the time of day parameter is met.

When it is determined, based on monitoring the parameter(s), that the at least one rule is satisfied, the at least one rule is applied (e.g., by the cloud computing server 228, the given gateway device 206, or the second media device $204_1$, $204_2$, ..., $204_Y$) to route the media stream data. For example, applying the at least one rule may involve transmitting the media stream data to the gateway device(s) 206 for buffering in the local storage media 214. Applying the at least one rule may alternatively involve transmitting, via the gateway device(s) 206, the media stream data to the cloud computing server 220 for storage in the cloud-based storage media 230. In yet other embodiments, applying the at least one rule may involve transmitting the media stream data directly to the cloud computing server 220 for storage in the cloud-based storage media 230. For example, the media stream data may be sent directly from one or more of the media devices $204_1$, $204_2$, ..., $204_Y$ to the cloud-based computing infrastructure 106. The media stream data may also be sent directly from the gateway device(s) 206 to the cloud-based computing infrastructure 106. In some embodiments, applying the at least one rule may involve sending the media stream data to both the local storage media 214 and the cloud-based storage media 230 for redundant archiving. In other embodiments, applying the at least one rule may involve continuously transmitting the media stream data (e.g., in real-time) to the local storage media 214 and/or the cloud-based storage media 230 for storage over a predetermined time period.

Applying the at least one rule may further involve pre-processing the media stream data prior to transmission thereof (e.g. to the local storage media 214 and/or the cloud-based storage media 230 for archiving). Such pre-processing may be performed using any suitable technique and may include, but is not limited to, modifying a quality of the media stream data, video transcoding the media stream data, decoding the media stream data, re-encoding the media stream data, applying at least one overlay on the media stream data, applying a privacy mask on the media stream data, digitally signing the media stream data, encrypting the media stream data, performing color correction on the media stream data, adding metadata to the media stream data (e.g., to indicate a time at which the media stream data was generated), and identifying, based on the media stream data, one or more objects present in a field of view of the one or more media devices $202_1$, $202_2$, ..., $202_X$, $204_1$, $204_2$, ..., $204_Y$ that generated the media stream data. For example, pre-processing may involve modifying the quality of the media stream data such that a different quality stream is sent to the gateway device 206. The at least one rule may further indicate that such intensive video analytics may only be required when an object detection algorithm (built in the media devices $202_1$, $202_2$, ..., $202_X$, $204_1$, $204_2$, ..., $204_Y$) detects an object of interest in the media stream data. As previously noted, video footage may also be sent to the gateway device 206 so that the gateway device 206 may control the bandwidth used between the local network $102_1$ and the cloud-based computing infrastructure 106 and, if needed, degrade the quality of some video streams based on predefined criteria. Moreover, video footage may be sent to the gateway device 206 for the latter to perform video transcoding and/or perform any other activity that would involve decoding and/or re-encoding of the stream (e.g., applying overlays or a privacy mask or digitally signing the video before it leaves the premises). Other embodiments may apply.

In some embodiments, when it is determined, based on monitoring the parameter(s), that the at least one rule is not satisfied and is therefore not applicable, a default (or fall-back) rule may be applied instead of the rule previously obtained. Any suitable default rule may apply. For example, the rule previously obtained (e.g., retrieved) may indicate that the media stream data is to be archived for a predetermined time period in order to comply with governmental regulations. However, the outcome of the monitoring of the parameters associated with the networks $102_1$, $102_2$, ..., and $102_N$ may indicate that the entirety of the media stream data cannot be archived for the predetermined time period (e.g., due to a change in quality of stored video, to the addition of new media devices $202_1$, $202_2$, ..., $202_X$, $204_1$, $204_2$, ..., $204_Y$, to the fact that the local storage media 214 does not have sufficient storage capacity, or the like). In this case, the default rule may indicate that part of the media stream data is to be archived in the local storage media 214 and part of the media stream data is to be archived in the cloud-based storage media 230. This would ensure that the media stream data is archive for the required time period. The default rule may also comprise instructions to output an alert (via any suitable communications means) to indicate the lack of sufficient local storage to meet the original requirements of the retrieved rule, to suggest to a user of the system 100 to expand the size of the local storage (e.g., of the local storage media 214), and/or to get the user to consent to using the cloud-based storage media 230 to supplement the local storage. It should be understood that other default rules may apply, depending on the application.

Figure 3:
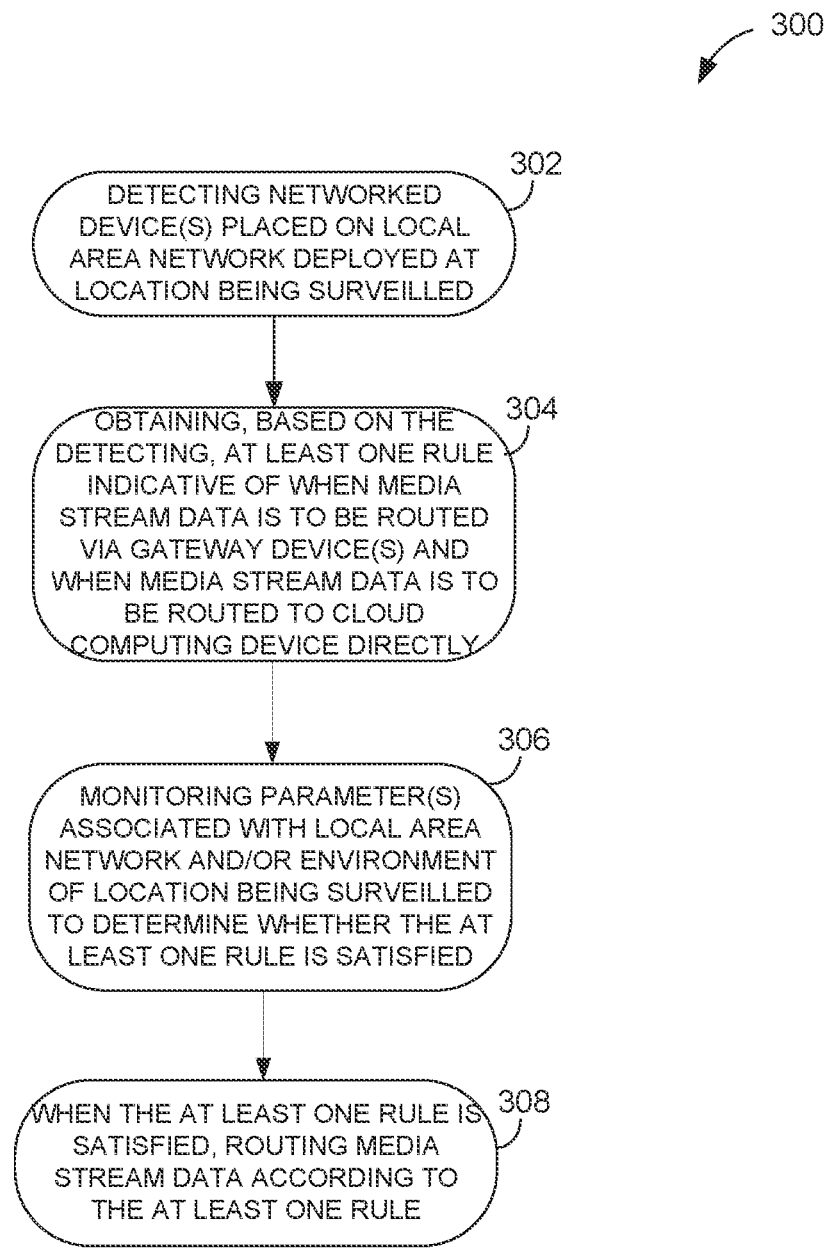
FIG. 3 is a flowchart illustrating an example method for routing media in a surveillance system, in accordance with an illustrative embodiment.

Referring now to FIG. 3, a method 300 for routing media in a surveillance system, such as the system 100 of FIG. 1, will now be described in accordance with one embodiment. The method 300 may be performed by any one of the cloud computing server 228, a gateway device 206, or a media device $202_1$, $202_2$, ..., $202_X$, $204_1$, $204_2$, ..., $204_Y$. The method 300 may be performed upon running an application on an operating system (e.g., a mobile operating system such as Android) of a computing device (e.g., a client device 216 of FIG. 2). The method comprises, at step 302, detecting one or more networked devices placed on a local network (e.g., network $102_1$ of FIG. 2) deployed at a location being surveilled. The one or more networked devices may comprise one or more media devices (e.g., video cameras or the like) and one or more gateway devices, each media device being configured to generate media as the location is being surveilled, and each gateway device having network connectivity to a cloud computing device (e.g., the cloud computing server 228 of FIG. 2). The method 300 further comprises, at step 304, obtaining at least one rule indicative of when the media stream data is to be routed via the gateway device(s) and when the media stream data is to be routed directly to the cloud computing device. The method 300 also comprises, at step 306, monitoring parameter(s) associated with the local network and/or an environment of the location being surveilled to determine whether the at least one rule is satisfied. When it is determined at step 306 that the at least one rule is satisfied, the method 300 then comprises, at step 308, routing the media stream data according to the at least one rule.

Figure 4:
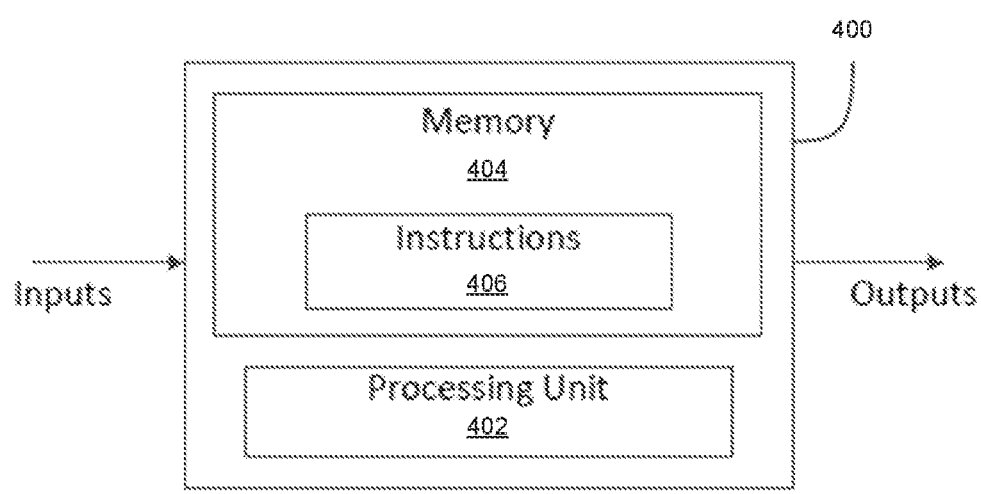
FIG. 4 is block diagram of an example computing device, in accordance with an illustrative embodiment.

FIG. 4 is a schematic diagram of computing device 400, which may be used to implement the method 300 of FIG. 3 (and/or one or more components of the system 100 of FIG. 1). In certain embodiments, the computing device 400 is operable to register and authenticate users (using a login, unique identifier, and password for example) prior to providing access to applications, a local network, network resources, other networks, and network security devices. The computing device 400 may serve one user or multiple users.

The computing device 400 comprises a processing unit 402 and a memory 404 which has stored therein computer-executable instructions 406. The processing unit 402 may comprise any suitable devices configured to implement the functionality of the method 300 such that instructions 406, when executed by the computing device 400 or other programmable apparatus, may cause the functions/acts/steps performed by method 300 as described herein to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitable programmed or programmable logic circuits, custom-designed analog and/or digital circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1004 may comprise any storage means (e.g. devices) suitable for retrievably storing machine-readable instructions 406 executable by the processing unit 402.

In some embodiments, the systems and methods described herein may allow to leverage resources locates on premises and in the cloud to optimize costs, network usage, reliability, resiliency, or any other parameter relevant to a hybrid deployment. In particular, the systems and methods described herein may facilitate the opportunistic use of local network resources by cloud cameras, based on a provided set of rules used for dynamic routing of media stream data within a surveillance system. In this fashion, cloud-aware cameras which encounter network issues, local storage issues, or similar challenges that may not be easily resolved within the structure of the cloud-aware camera itself may instead rely on other elements of the local network, of which the cloud cameras were not previously aware.

In some cases, employing the methods and systems described herein may result in reduced data loss and/or improved data availability at any given time for a given cloud camera in a hybrid deployment. In some cases, employing the methods and systems described herein may facilitate data redundancy independently of the particular storage capability of a given cloud camera in a hybrid deployment. In some cases, employing the methods and systems described herein may facilitate adherence to legal or regulatory requirements for operators of a cloud camera in a hybrid deployment where the cloud camera itself would not have been capable of adhering to the requirements. In some cases, employing the methods and systems described herein may facilitate cloud streaming of media streams generated by the media devices $202_1, 202_2, \ldots, 202_X, 204_1, 204_2, \ldots,$ and/or $204_Y$, or otherwise improve cloud availability of the media streams. In some cases, employing the methods and systems described herein may improve failover capabilities of the media devices $202_1, 202_2, \ldots, 202_X, 204_1, 204_2, \ldots,$ and/or $204_Y$. In some cases, employing the methods and systems described herein may assist operators of the surveillance system 100 in better managing costs by enabling the media devices $204_1, 204_2, \ldots,$ and/or $204_Y$ to employ local resources they may otherwise not have otherwise been aware of.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

What is claimed is:

1. A method for routing media in a surveillance system, the method comprising:
   at a gateway device placed on a local network deployed at a location being surveilled, the gateway device having network connectivity to a cloud computing device,
   detecting one or more networked devices placed on the local network, the one or more networked devices comprising one or more media devices each configured to generate media stream data as the location is being surveilled;
   obtaining, based on the detecting, at least one rule indicative of when the media stream data is to be routed via the gateway device and when the media stream data is to be routed directly to the cloud computing device for processing;
   monitoring one or more parameters associated with at least one of the local network and an environment of the location being surveilled to determine whether the at least one rule is satisfied; and
   when the at least one rule is satisfied, instructing the one or more networked devices to route the media stream data according to the at least one rule.

2. The method of claim 1, wherein the gateway device is one of a plurality of gateway devices, and further wherein the one or more network devices comprise remaining ones of the plurality of gateway devices having network connectivity to the cloud computing service.

3. The method of claim 1, wherein detecting the one or more networked devices comprises:
   transmitting at least one broadcast message over the local network;
   receiving, from the one or more networked devices, at least one response message to the at least one broadcast message; and
   detecting, based on the at least one response message, a presence of the one or more networked devices on the local network.

4. The method of claim 1, wherein detecting the one or more networked devices comprises determining at least one of an Internet Protocol (IP) address and a configuration of each of the one or more networked devices.

5. The method of claim 4, wherein determining the configuration of each networked device comprises determining at least one of a type, a transmission capability, and a reception capability of each networked device.

6. The method of claim 5, wherein determining the configuration of each networked device comprises determining that the one or more media devices comprise at least one first video camera configured to access the cloud computing device via the gateway device.

7. The method of claim 6, wherein determining the configuration of each networked device comprises determining that the one or more media devices further comprise at least one second video camera configured to directly access the cloud computing device.

8. The method of claim 1, wherein obtaining the at least one rule comprises:
   sending a request for the at least one rule to the cloud computing device; and
   receiving the at least one rule from the cloud computing device in response to the request.

9. The method of claim 1, wherein obtaining the at least one rule comprises:
   sending a request for the at least one rule to a given one of the one or more networked devices; and receiving the at least one rule from the given one of the one or more networked devices in response to the request.

10. The method of claim 1, wherein instructing the at least one of the one or more networked devices to route the media stream data according to the at least one rule comprises at least one of:
instructing the at least one of the one or more networked devices to transmit, via the gateway device, the media stream data to local storage media placed on the local network;
instructing the at least one of the one or more networked devices to transmit, via the gateway device, the media stream data to the cloud computing device for storage in cloud-based storage media associated with the cloud computing device; and
instructing the at least one of the one or more networked devices to transmit the media stream data directly to the cloud computing device for storage in the cloud-based storage media.

11. The method of claim 10, further comprising pre-processing the media stream data prior to transmitting the media stream data to at least one of the local storage media and the cloud-based storage media.

12. The method of claim 11, wherein pre-processing the media stream data comprises one of modifying a quality of the media stream data, video transcoding the media stream data, decoding the media stream data, re-encoding the media stream data, applying at least one overlay on the media stream data, applying a privacy mask on the media stream data, digitally signing the media stream data, encrypting the media stream data, performing color correction on the media stream data, adding metadata to the media stream data, and identifying, based on the media stream data, one or more objects present in a field of view of the one or more media devices.

13. The method of claim 11, wherein instructing the at least one of the one or more networked devices to route the media stream data according to the at least one rule comprises instructing the at least one of the one or more networked devices to continuously transmit the media stream data to at least one of the local storage media and the cloud-based storage media for storage over a predetermined time period.

14. The method of claim 1, wherein detecting the one or more networked devices placed on the local network comprises detecting at least one display device connected to the one or more media devices, the at least one display device configured to render the media stream data thereon.

15. The method of claim 1, wherein the detecting the one or more networked devices placed on the local network is performed one of periodically, in response to a user-initiated command, in response to a system-initiated command, and in response to the one or more media devices connecting to the local network.

16. The method of claim 1, wherein monitoring one or more parameters associated with at least one of the local network and an environment of the location being surveilled comprises monitoring at least one of a performance of the local network, a performance of the cloud computing device, a time of day, a current weather at the location, a visibility at the location, a field of view of the one or more media devices, and a positioning of the one or more media devices within the environment.

17. A method for routing media in a surveillance system, the method comprising:
at a cloud computing server,
determining that one or more networked devices are placed on a local network deployed at a location being surveilled, the one or more networked devices comprising one or more media devices and one or more gateway devices, each media device configured to generate media stream data as the location is being surveilled, and each gateway device having network connectivity to the cloud computing server;
obtaining, based on the detecting, at least one rule indicative of when the media stream data is to be routed via the one or more gateway devices and when the media stream data is to be routed directly to the cloud computing server for processing;
monitoring one or more parameters associated with at least one of the local network and an environment of the location being surveilled to determine whether the at least one rule is satisfied; and
when the at least one rule is satisfied, instructing at least one of the one or more networked devices to route the media stream data according to the at least one rule.

18. The method of claim 17, wherein determining that the one or more networked devices are placed on the local network comprises receiving, from a given one of the one or more media devices and the one or more gateway devices, at least one signal indicative of a presence of the one or more networked devices on the local network.

19. The method of claim 17, wherein detecting the one or more networked devices comprises receiving, from at least one of the one or more gateway devices, at least one signal indicative of a presence of the one or more networked devices on the local network.

20. The method of claim 17, wherein detecting the one or more networked devices comprises receiving, from at least one of the one or more media devices, at least one signal indicative of a presence of the one or more networked devices on the local network.

21. The method of claim 17, wherein instructing at least one of the one or more networked devices to route the media stream data according to the at least one rule comprises at least one of:
instructing the at least one of the one or more networked devices to transmit, via the one or more gateway devices, the media stream data to local storage media placed on the local network;
instructing the at least one of the one or more networked devices to transmit, via the one or more gateway devices, the media stream data to the cloud computing server for storage in cloud-based storage media provided by the cloud computing server; and
instructing the at least one of the one or more networked devices to transmit the media stream data directly to the cloud computing server for storage in the cloud-based storage media.

22. The method of claim 21, wherein instructing the at least one of the one or more networked devices to route the media stream data according to the at least one rule comprises instructing the at least one of the one or more networked devices to continuously transmit the media stream data to at least one of the local storage media and the cloud-based storage media for storage over a predetermined time period.

23. The method of claim 17, wherein the detecting the one or more networked devices placed on the local network is performed one of periodically, in response to a user-initiated command, in response to a system-initiated command, and in response to the one or more media devices connecting to the local network.

24. The method of claim 17, wherein monitoring one or more parameters associated with at least one of the local network and an environment of the location being surveilled comprises monitoring at least one of a performance of the local network, a performance of the cloud computing server, a time of day, a current weather at the location, a visibility at the location, a field of view of the one or more media devices, and a positioning of the one or more media devices within the environment.

25. A method for routing media in a surveillance system, the method comprising:
- at one of a plurality of media devices placed on a local network deployed at a location being surveilled,
- detecting one or more networked devices placed on the local network, the one or more networked devices comprising remaining ones of the plurality of media devices and one or more gateway devices, each media device from the plurality of media devices configured to generate media stream data as the location is being surveilled, and each gateway device having network connectivity to a cloud computing device;
- obtaining, based on the detecting, at least one rule from at least one of the cloud computing device and the one or more gateway devices, the at least one rule indicative of when the media stream data is to be routed via the one or more gateway devices and when the media stream data is to be routed directly to the cloud computing device for processing;
- monitoring one or more parameters associated with at least one of the local network and an environment of the location being surveilled to determine whether the at least one rule is satisfied; and
- when the at least one rule is satisfied, routing the media stream data according to the at least one rule.

26. The method of claim 25, wherein detecting the one or more networked devices comprises:
- transmitting at least one broadcast message over the local network;
- receiving, from the one or more networked devices, at least one response message to the at least one broadcast message; and
- detecting, based on the at least one response message, a presence of the one or more networked devices on the local network.

27. The method of claim 25, wherein obtaining the at least one rule comprises:
- sending a request for the at least one rule to the cloud computing device; and
- receiving the at least one rule from the cloud computing device in response to the request.

28. The method of claim 25, wherein obtaining the at least one rule comprises:
- sending a request for the at least one rule to a given one of the one or more networked devices; and
- receiving the at least one rule from the given one of the one or more networked devices in response to the request.

29. The method of claim 25, wherein routing the media stream data according to the at least one rule comprises at least one of:
- transmitting, via the one or more gateway devices, the media stream data to local storage media placed on the local network;
- transmitting, via the one or more gateway devices, the media stream data to the cloud computing device for storage in cloud-based storage media associated with the cloud computing device; and
- transmitting the media stream data directly to the cloud computing device for storage in the cloud-based storage media.

30. The method of claim 29, further comprising pre-processing the media stream data prior to transmitting the media stream data to at least one of the local storage media and the cloud-based storage media.

31. The method of claim 30, wherein pre-processing the media stream data comprises one of modifying a quality of the media stream data, video transcoding the media stream data, decoding the media stream data, re-encoding the media stream data, applying at least one overlay on the media stream data, applying a privacy mask on the media stream data, digitally signing the media stream data, encrypting the media stream data, performing color correction on the media stream data, adding metadata to the media stream data, and identifying, based on the media stream data, one or more objects present in a field of view of the plurality of media devices.

32. The method of claim 30, wherein routing the media stream data according to the at least one rule comprises continuously transmitting the media stream data to at least one of the local storage media and the cloud-based storage media for storage over a predetermined time period.

33. The method of claim 25, wherein detecting the one or more networked devices placed on the local network comprises detecting at least one local storage media connected to the one or more gateway devices, the at least one local storage media configured to store the media stream data therein.

34. The method of claim 25, wherein the detecting the one or more networked devices placed on the local network is performed one of periodically, in response to a user-initiated command, in response to a system-initiated command, and in response to the plurality of media devices connecting to the local network.

35. The method of claim 25, wherein monitoring one or more parameters associated with at least one of the local network and an environment of the location being surveilled comprises monitoring at least one of a performance of the local network, a performance of the cloud computing device, a time of day, a current weather at the location, a visibility at the location, a field of view of the one or more media devices, and a positioning of the one or more media devices within the environment.

\* \* \* \* \*